S. BROWN.
FINDER FOR CAMERAS.
APPLICATION FILED JAN. 20, 1915.

1,154,966.

Patented Sept. 28, 1915.

Witnesses:
A. R. Appleman
W. H. Hawkins

Inventor,
Stanley Brown,
By his Attorney Phillips Abbott

UNITED STATES PATENT OFFICE.

STANLEY BROWN, OF GARDEN CITY, NEW YORK.

FINDER FOR CAMERAS.

1,154,966.  Specification of Letters Patent.  Patented Sept. 28, 1915.

Application filed January 20, 1915. Serial No. 3,214.

*To all whom it may concern:*

Be it known that I, STANLEY BROWN, a citizen of the United States, and a resident of the city of Garden City, county of Nassau, and State of New York, have invented certain new and useful Improvements in Finders for Cameras, of which the following is a specification.

It is the purpose of this invention to provide a compact, accurately operating and comprehensive finding device embodying such parts that a photographer having a camera equipped therewith may readily and reliably effect all the so-called "finding" of the subject to be photographed that he will require under practically all conditions and to this end I provide an ordinary reflecting finder, the image glass of which is adjustable to compensate for offsetting from the horizontal of the subject to be photographed and for proper aiming for short range photography; also upon the same support I provide a direct view finder closely adjacent to the reflecting finder, and also I provide a level to aid in determining the horizontal position of the camera.

The invention furthermore embodies a novel means of attaching the structures above described to the lens tube or equivalent part of the lens supporting frame.

Figure 1:
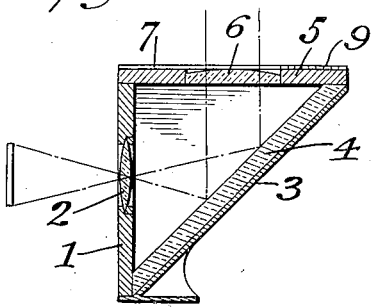
Figure 2:
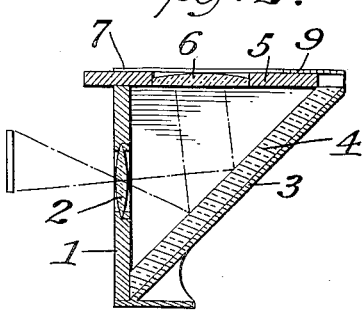
Figure 3:
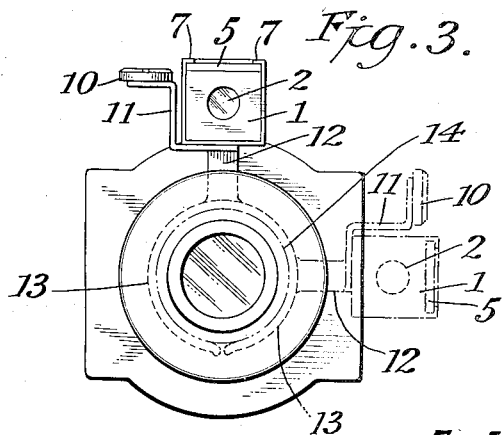
Figure 4:
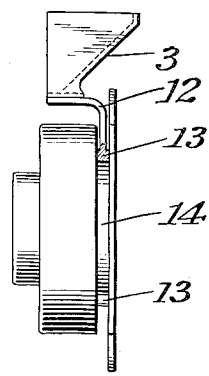
Figure 5:
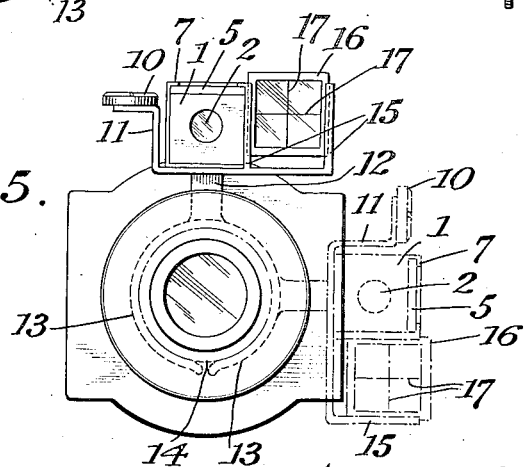

In the drawings Figure 1 is a vertical sectional view of a reflecting finder embodying the invention; Fig. 2 is a view similar to Fig. 1, showing the image glass as shifted in position relative to the mirror; Fig. 3 is an elevation of the front of a lens casing and shows a reflecting finder and level combined with my new split ring device for attachment to the lens tube: Fig. 4 is an edgewise view, partly in section, of that which is shown in full lines in Fig. 3; Fig. 5 is a front elevation of the lens frame and finder structure, showing its adaptability to a horizontal as well as a vertical position of the camera.

In the drawings, 1 represents the front wall of an ordinary reflecting finder carrying the finder lens 2.

3 is the rear of the finder, which supports the mirror 4 and 5 is the top of the finder, which supports the image glass 6. The top 5 of the finder and the image glass 6 supported by it are so constructed and assembled that they have a forward and rearward sliding movement, being confined and guided by the overlapping flanges 7 on each side of the finder (see best Fig. 3); also suitable stops (not shown) to limit the forward and rearward movements of the image glass may be supplied if desired.

The operation of the apparatus thus far described is as follows: The camera is held horizontal, as determined by the level 10 (see Fig. 3). The finder image glass 6 is then in its normal position and the camera lens is in its normal position, co-axial with the camera, so to speak. If the proper view is included in the image glass 6, the exposure can properly be made. If, however, it is noted that the image glass 6 must be moved forwardly or rearwardly to properly include the desired view, the markings 9 on the top or edge of one of the overlapping flanges 7 and a reference line or point on the top board 5 will be inspected to note the extent of shift and then if the camera lens be shifted to the same extent, or through the same optical angle by reference to a similar or harmonious set of markings or scale and reference line or point (not shown) on the camera lens supporting structure on the movable and stationary portions respectively, the camera lens will then cause exactly the same view to be subtended by the sensitive surface as is observed in the image glass 6.

For "offset exposures," this will allow accurate use of the rising and sliding front or the camera lens supporting structure without the necessity of temporarily substituting the film or plate by a ground glass and will be of particular value for roll film cameras.

The above description deals with views or objects which are offset vertically. The sliding image glass has an additional important function. The set of markings 9 hereinbefore described may be confined to one of the overlapping flanges 7 and on the other flange 7 (see Figs. 1 and 3) a set of markings or numbers may be placed to harmonize with the focusing scale of the camera. It will be remembered (see Fig. 3) that the axis of the finder for each position of the camera is directly vertically above the axis of the camera lens, which insures perfect lateral alinement. Now if for short range photography (from 5 to 15 feet more or less, for instance), by reference to this new set of markings, the image glass 6 be moved rearwardly to the line or mark corresponding to the focal distance of the exposure, as noted by reference to the focusing scale of the camera, the image glass will then precisely include the same image as subtended by the sensitive surface.

Referring now more particularly to Figs. 3 and 4, similar reference numerals indicate similar parts. 10 represents a level which is supported upon a bracket 11 attached to any suitable part of the finder frame or support and the finder and level are both supported upon an upright 12 which connects with a ring 13 which is preferably split and which is made of resilient material and is adapted to be sprung over the lens tube 14 or to be slid on to the tube or otherwise so placed in the process of assembling (see Fig. 4) and to grip it resiliently with sufficient force to securely hold the finder and level in such position as they may be left by the photographer. This construction is employed so that as shown in Figs. 3 and 5, when desired, the finder and level, and as shown in Fig. 5, the direct view finder also, if it be employed, may be swung through approximately 90 degrees, as illustrated in dotted lines in Figs. 3 and 5, to provide for the use of the camera in a horizontal as well as in a vertical position.

In Fig. 5 I show a construction in which not only a reflecting finder and level, but also the screen of a direct view finder are provided, the reflecting finder and level being indicated by the same reference numerals as heretofore. The direct view finder screen is shown as follows: 15 represents two verticals which are grooved upon their opposed faces, in which slides a frame 16 which supports the usual reducing lens and cross lines, or their equivalents, 17 of the direct view finder. This frame may be stationary in the uprights 15, but I prefer to make it movable as above described, for in cameras of certain construction and relatively large boxes, it will be necessary to shift the frame 16 outwardly to properly aline it with the sighting member of the direct view finder, in order that the axes of the camera and of the finder may harmonize. It is an advantage to have the frame 16 move with the camera lens, for, as the sighting member of the direct view finder is stationary, being preferably mounted on the camera box, and also since the sensitive surface is stationary, we have a harmonious relation of exposure image and image in the direct view finder, even when the camera lens is offset from the camera axis.

In Fig. 5 I show all of the elements, that is to say, the level, the reflecting finder and the direct view finder screen, as swung through an arc of 90 degrees, as indicated in dotted lines.

I illustrate a well known circular level 10 provided with a shot or bubble, as shown. It will of course be understood that any equivalent form may be substituted therefor and also that the markings or indices indicated upon the movable top board 5 which supports the image glass 6 in the reflecting finder, and also the harmonious markings on the fixed and movable members of the lens frame or supporting structure, may be modified as convenience or preference may suggest.

It is not essential that my clamping or resilient ring 13 embracing the lens tube be employed, although it is a useful improvement, because other means of support may be adapted to certain phases of my invention, and even if the clamping ring 13 be employed, it may be engaged with some other suitable part of the apparatus rather than with the lens tube 14.

It will be noted that under my invention practically all of the so-called "finding" that a photographer will ever desire in practice may be accomplished by the simple devices I describe, constructed and arranged as set forth, that is to say, the level will quickly and easily determine the horizontal the reflecting finder with its adjustable image glass and the indices provided therefor and the harmonious markings on the lens supporting structure, will enable the photographer to accurately determine when the subject is properly centered or located upon the sensitive surface, irrespective of its offsetting from the horizontal, and the direct view finder, the sight of which will of course be some fixed point or fitting, preferably on the camera casing, will enable the photographer to properly center or locate the subject upon the sensitive surface when it is desirable to use a direct view finder, and the clamping ring affords a reliable, durable and easily manipulated means whereby the entire finding apparatus may be adjusted both to the vertical and horizontal use of the camera. Furthermore it will be noted by reference to Fig. 3, that my finder supporting and attaching structure allows the finder to swing through 90 degrees about the axis of the camera lens as a center, so that for both positions of the camera, the finder will have its optical axis directly vertically above the camera lens axis, which will be of great importance for correct lateral locating of the object to be photographed for short range photography, that is from 5 to 15 feet more or less.

It will be obvious to those who are familiar with this art that the illustrations I present constitute one form only in which the invention may be embodied and furthermore that modifications may be made in the details of construction without departing from the essentials of the invention. As an instance of this, the frame of the direct view finder need not necessarily be set side by side with the reflecting finder, but may be supported at any other suitable part of the apparatus, for example, it could be pivotally connected to the top of the back 3 of the reflecting finder and if so, when not in use could be folded flat against the back 3 and when in use, would be swung upwardly to suitable position for operation. I therefore do not limit myself to such details.

I claim.

1. In a photographic camera, a reflecting finder the image glass whereof is adjustable forwardly and rearwardly.

2. A photographic finder in which a level and the finder are supported upon the same structure and moved as a unit, the image glass of the finder being adjustable forwardly and rearwardly.

3. A photographic finder the image glass of which is adjustable forwardly and rearwardly, an index to determine the degree of its movement and harmonious markings for the adjusting of the camera lens.

4. A photographic finder the image glass of which is adjustable forwardly and rearwardly, an index to determine the degree of its movement, a level, and harmonious markings for the adjustment of the camera lens.

5. In a photographic finder, a reflecting finder supported upon a movable device adapted to quarter rotation about the axis of the camera lens as a center, so that the axis of the finder lens is in the same vertical plane as the axis of the camera lens in both positions of the camera.

6. In a photographic camera, a reflecting finder supported upon a movable device adapted to quarter rotation about the axis of the camera lens as a center, so that the axis of the finder lens is in the same vertical plane as the axis of the camera lens in both positions of the camera, the image glass of the reflecting finder being adjustable forwardly and rearwardly, an index to determine its movement and harmouious markings for the corresponding adjustment of the camera lens.

In testimoy whereof I have signed my name to this specification in the presence of two subscribing witnesses.

STANLEY BROWN.

Witnesses:
T. M. DONSBACH,
CORNELIUS P. MCLAUGHLIN.